United States Patent Office 3,850,992
Patented Nov. 26, 1974

3,850,992
ALIPHATIC INDANYL ETHERS
John W. Baum, Palo Alto and John D. Diekman, Menlo Park, Calif., assignors to Zoecon Corporation, Palo Alto, Calif.
No Drawing. Filed July 20, 1971, Ser. No. 164,437
Int. Cl. C07c 43/20
U.S. Cl. 260—612 D                                21 Claims

ABSTRACT OF THE DISCLOSURE

Aliphatic indanyl ethers prepared by the alkylation of 5-indanol useful for insect control.

---

This invention relates to novel aliphatic indanyl ethers and the preparation and use thereof. More particularly, the novel aliphatic indanyl ethers are represented by the following formula (A):

$$R^3-\underset{\underset{Z}{|}}{\overset{\overset{R^2}{|}}{C}}-CH-(CH_2)_n-\underset{\underset{W}{|}}{\overset{\overset{R^1}{|}}{C}}-CH-(CH_2)_m-O-R$$
$$\phantom{R^3-C-CH-(CH_2)_n-C-CH-(CH_2)_m-O-R}\text{(A)}$$

wherein,

R is

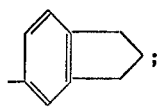

;

$m$ is zero or one; $n$ is one or two; each of $R^1$, $R^2$ and $R^3$ is lower alkyl; each of W and W' is hydrogen or together a carbon-carbon bond; Z is hydrogen, hydroxy, lower alkoxy, lower acyloxy or lower alkyl;

Z' is hydrogen or together with Z a carbon-carbon bond, oxido or epithio, provided that when $m$ is zero—then each of W and W' is hydrogen.

The term "lower alkyl," as used herein, refers to an alkyl group, straight or branched, having a chain length of one to six carbon atoms. The term "lower alkoxy," as used herein, refers to an alkoxy group of one to six carbon atoms such as methoxy, ethoxy, t-butoxy, and the like. The term "lower acyloxy," as used herein, refers to an acyloxy group of one to six carbon atoms such as acetoxy, propionoxy, trimethylacetoxy, and the like.

The compounds of formula A are useful insect control agents. For application, the insect control agents of the present invention are applied using a suitable carrier substance, liquid or solid, such as talc, silica, cellulose, synthetic and natural resins, water, acetone, xylene and mineral and vegetable oils. Generally, a formulation will contain less than 95% of the insect control agent and more frequently less than 25%. Sufficient application should be made to provide from about 1.0 to 50 micrograms of insect control agent per insect based upon the estimated population. Typical insects which can be controlled by the present invention are members of Diptera, Coleoptera, Homoptera, Hemiptera, Lepidoptera and Orthoptera such as mosquitos, aphids, beetles, moths, roaches and graphasoma. Preferably the insect control agent is applied to the immature insect at the embryo, larvae or pupae stage. Without any intention of being bound by theory, the insect control agents of the present invention, unlike conventional insecticides, are believed to be effective control agents by disrupting normal metamorphic development resulting in abnormal development and, in some cases, sterility and inability to reproduce.

The compounds of formula A are useful also as lubricants and plasticizers. They are particularly useful as plasticizers for hydrocarbon polymers and vinyl chloride polymers and copolymers such as polyvinyl chloride and vinyl chloride-vinyl acetate copolymers.

The compounds of formula A are prepared according to the following outlined synthesis:

$$R^3-\underset{\underset{Z}{|}}{\overset{\overset{R^2}{|}}{C}}-CH-(CH_2)_n-\underset{\underset{W}{|}}{\overset{\overset{R^1}{|}}{C}}-CH-(CH_2)_m-X \quad \text{(II)}$$

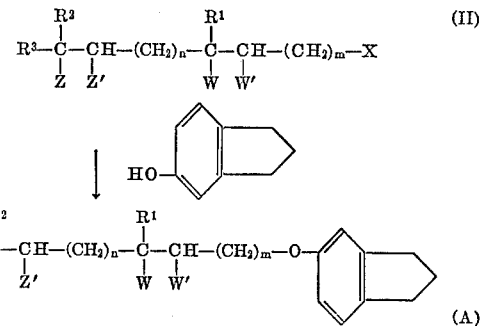

$$R^3-\underset{\underset{Z}{|}}{\overset{\overset{R^2}{|}}{C}}-CH-(CH_2)_n-\underset{\underset{W}{|}}{\overset{\overset{R^1}{|}}{C}}-CH-(CH_2)_m-O-$$

(A)

In the above formulas, each of $m$, $n$, $R^1$, $R^2$, $R^3$, W', W, Z and Z' is as defined above and X is bromo, chloro, iodo, methanesulfonyloxy or tolylsulfonyloxy.

In the practice of the above outlined syntheses, an alkylating agent of formula II is reacted with a salt of 5-indanol in an organic solvent inert to the reaction at about 0° to reflux temperature, to form the aliphatic indanyl ether (A). The reaction is generally carried out by first forming a salt by the addition of a base such as potassium carbonate, sodium hydride, or the like, to 5-indanol in an organic solvent such as ether, tetrahydrofuran, dimethylformamide, dimethylacetamide, dimethylsulfoxide, or the like, followed by the addition of the alkylating agent (II).

Epoxides (Z' together with Z is oxido) are prepared by treatment of the terminal double bond of a compound of formula II or A (wherein Z' together with Z is a carbon-carbon bond) with m-chloroperbenzoic acid, perbenzoic acid, perphthalic acid, or the like.

Alkoxy compounds (Z in lower alkoxy) are prepared by treating the terminal double bond of a compound of formula II or A with mercuric salt in the presence of the appropriate lower alcohol followed by reduction of the oxy-mercurial intermediate with sodium borohydride or the like. Hydroxy compounds are prepared by mercuric salt treatment in the presence of water followed by reduction. The hydroxy derivatives by reaction with carboxylic acid chloride, bromide or anhydride provides the compounds of formula A wherein Z is lower acyloxy.

The episulfides (Z' together with Z is epithio) are prepared by treating the epoxide precursor with potassium thiocyanate or ammonium thiocyanate in an organic solvent such as a lower alcohol.

The following examples are provided to illustrate the present invention. Temperature is given in degrees centigrade.

EXAMPLE 1

A mixture of 5.52 g. of potassium carbonate, 2.68 g. of 5-indanol and 10 ml. of dimethylformamide is heated at 70° for 0.5 hour. Then, 4.63 g. of the mesylate of 3,7-dimethyloct-6-en-1-ol in 10 ml. of dry dimethylformamide is added. After about 20 hours at 70°, the mixture is poured into 100 g. of ice water and extracted (3×) with 100 ml. of hexane/ether (1/1). The extract is washed with 2N sodium hydroxide, water and brine and dried over calcium sulfate and filtered to yield 5-(3', 7'-dimethyloct-6'-enloxy) indane (1-citronellyl-5-indanyl ether) which can be purified by distillation.

EXAMPLE 2

To a mixture of 5.52 g. of potassium carbonate and 2.68 g. of 5-indanol in 10 ml. of dry dimethylformamide, heated at 70° for 0.5 hour, is added 4.72 g. of dihydrocitronellyl mesylate (3,7-dimethyloctan-1-yl methanesulfonate) in 10 ml. of dry dimethylformamide. The reaction mixture is heated at 70° for about 22 hours, under nitrogen, with stirring. The reaction is then worked up as described in Example 1 to yield 5-(3',7'-dimethyloctan-1'-yloxy) indane which can be purified by distillation.

EXAMPLE 3

A mixture of 1.34 g. of 5-indanol, 10 ml. of dry dimethylformamide and 4 equivalents of potassium carbonate is mixed and heated at 70° for 0.5 hour. Then 10 mmole of 6,7-oxido-3,7-dimethyloctan-1-yl methanesulfonate in 10 ml. of dry dimethylformamide is added and the mixture heated at 70°, under nitrogen, with stirring for about 20.5 hours. The reaction is then worked up as described in Example 1 to yield 5-(6',7'-oxido-3',7'-dimethyloctan-1'-yloxy) indane which can be purified by chromatography or distillation.

EXAMPLE 4

To a mixture of 2.68 g. of 5-indanol and 5.52 g. of potassium carbonate in 10 ml. of dry dimethylformamide, heated to about 60° for 0.5 hour, under nitrogen, is added 20 mmoles of 3,7-dimethylocta-2,6-dienyl bromide. The mixture is stirred at about 50° for about 24 hours and then filtered. The filtrate is poured into water and extracted with hexane/ether (1/1). The extract is washed with 2N sodium hydroxide, water and brine, dried over calcium sulfate and evaporated to yield 5-(3',7'-dimethylocta-2',6'-dienyloxy) indane which can be purified by chromatography.

EXAMPLE 5

The mesylate of 2,5-dimethylhex-4-en-1-ol is reacted with the potassium salt of 5-indanol using the procedure of Example 1 to yield 5-(2',5'-dimethylhex-4'-enyloxy) indane. Each of 5-(3',7'-diethylnona-2',6'-dienyloxy) indane, 5-(3'-methyl-7'-ethylnona-2',6'-dienyloxy) indane and 5-(3',7'-dimethylnona-2',6'-dienyloxy) indane is prepared following the procedure of Example 4 using 3,7-dimethylnona-2,6-dienyl bromide, 3-methyl-7-ethylnona-2,6-dienyl bromide and 3,7-dimethylnona-2,6-dienyl bromide or chloride, respectively, as the starting material in place of 3,7-dimethylocta-2,6-dienyl bromide.

EXAMPLE 6

To a solution of 0.25 g. of 1-citronellyl-5-indanyl ether and 10 ml. of methylene chloride, cooled to ice temperature, is added 0.19 g. of m-chloroperbenzoic acid (85%) in portions. The reaction is stirred at ice temperature for about five hours. The mixture is then washed with 10% sodium sulfite, saturated sodium sulfite, saturated sodium bicarbonate and water, dried over sodium sulfate and evaporated to yield 5-(6',7'-oxido-3',7'-dimethyloctanyloxy) indane which can be purified by chromatography or by distillation.

The foregoing process is repeated using each of 5-(3',7'-dimethylocta-2',6'-dienyloxy) indane,
5-(2',5'-dimethylhex-4'-enyloxy) indane,
5-(3',7'-diethylnona-2',6'-dienyloxy) indane,
5-(3'-methyl-7'-ethylnona-2',6'-dienyloxy) indane, and
5-(3',7'-dimethylnona-2',6'-dienyloxy) indane as the starting material to yield the respective epoxide, i.e.

5-(6',7'-oxido-3',7'-dimethyloct-2'-enyloxy) indane,
5-(4',5'-oxido-2',5'-dimethylhexyloxy) indane,
5-(6',7'-oxido-3',7'-diethylnon-2'-enyloxy) indane,
5-(6',7'-oxido-3'-methyl-7'-ethylnon-2'-enyloxy) indane, and
5-(6',7'-oxido-3',7'-dimethylnon-2'-enyloxy) indane.

EXAMPLE 7

To 0.8 g. of 5-(6',7'-oxido-3',7'-dimethyloctanyloxy) indane in 30 ml. of absolute ethanol is added 5.2 ml. of water and 1.1 g. of potassium thiocyanate. The mixture is heated at reflux for about 50 hours. The mixture is then poured into brine and extracted with ether. The extract is washed with brine, dried and solvent evaporated to yield 5-(6',7'-epithio-3',7'-dimethyloctanyloxy) indane which can be purified by chromatography.

By the use of the process of this example, other epoxides of formula A such as those of Example 6 are treated with potassium thiocyanate or ammonium thiocyanate to prepare the respective episulfide, e.g.

5-(6',7'-epithio-3',7'-dimethyloct-2'-enyloxy) indane,
5-(4',5'-epithio-2',5'-dimethylhexanyloxy) indane,
5-(6',7'-epithio-3',7'-diethylnon-2'-enyloxy) indane,
5-(6',7'-epithio-3'-methyl-7'-ethylnon-2'-enyloxy) indane, and
5-(6',7'-epithio-3',7'-dimethylnon-2'-enyloxy) indane.

EXAMPLE 8

To a solution of 2 g. of 5-(3',7'-dimethylocta-2',6'-dienyloxy) indane in 20 ml. of ethanol, cooled to 0° by an ice bath, is added a suspension of 2.32 g. of mercuric acetate in 50 ml. of ethanol over 15 minutes. The reaction mixture is stirred for two hours and then, with cooling 1.22 g. of potassium hydroxide in 20 ml. of ethanol is added. Then 0.139 g. of sodium borohydride is added in small portions and stirring continued 30 minutes. The solution is decanted, then concentrated to half volume, diluted with 100 ml. of water and extracted with ether (3× 50 ml.). The ethereal phase is washed with water, dried over magnesium sulfate, and the crude product chromatographed to yield 5-(3',7'-dimethyl-7'-ethoxyoct-2'-enyloxy) indane.

The foregoing process is repeated using each of 5-(3',7'-dimethyloct-6'-enyloxy)-indane,
5-(2',5'-dimethylhex-4'-enyloxy) indane,
5-(3',7'-diethylnona-2',6'-dienyloxy) indane,
5-(3'-methyl-7'-ethylnona-2',6'-dienyloxy) indane, and
5-(3',7'-diethylnona-2',6'-dienyloxy) indane as the starting material to yield 5-(7'-ethoxy-3',7'-dimethyloctanyloxy) indane,
5-(5'-ethoxy-2',5'-dimethylhexanyloxy) indane,
5-(7'-ethoxy-3',7'-diethylnon-2'-enyloxy) indane,
5-(7'-ethoxy-3'-methyl-7'-ethylnon-2'-enyloxy) indane, and
5-(7'-ethoxy-3',7'-dimethylnon-2'-enyloxy) indane, respectively.

By use of each of methanol, n-propanol, i-propanol and t-butanol in the process of this example in place of ethanol, the corresponding additives are obtained. For example, 5 - (7'-methoxy-3',7'-dimethyloct-2'-enyloxy) indane, 5 - (7'-methoxy-3',7'-dimethyloctanyloxy) indane, 5-(5'-methoxy-2',5'-dimethylhexanyloxy) indane, etc.

EXAMPLE 9

To a mixture of 1.9 g. of mercuric acetate, 6 ml. of water and 20 ml. of tetrahydrofuran is added 1.49 g. of 5-(3',7'-diethylnona-2',6'-dienyloxy) indane slowly. After addition is complete, the reaction mixture is stirred for about 20 minutes. The mixture is cooled to about 0° and 6 ml. of aqueous sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed to yield 5-(7'-hydroxy-3',7'-diethylnon-2'-enyloxy) indane.

The above process is repeated with the exception of using each of 5-(3',7'-dimethyloct-6'-enyloxy) indane,
5-(2',5'-dimethylhex-4'-enyloxy) indane,
5-(3',7'-diethylnona-2',6'-dienyloxy) indane,
5-(3',7'-dimethylnona-2',6'-dienyloxy) indane, and
5-(3'-methyl-7'-ethylnona-2',6'-dienyloxy) indane as the starting material to yield 5-(7'-hydroxy-3',7'-dimethyloctanyloxy) indane,
5-(5'-hydroxy-2',5'-dimethylhexanyloxy) indane,
5-(7'-hydroxy-3',7'-diethylnon-2'-enyloxy) indane,
5-(7'-hydroxy-3',7'-dimethylnon-2'-enyloxy) indane, and
5-(7'-hydroxy-3'-methyl-7'-ethylnon-2'-enyloxy) indane, respectively.

EXAMPLE 10

A mixture of 1 g. of 5-(7'-hydroxy-3',7'-dimethyloctanyloxy) indane, 10 ml. of acetic anhydride and 0.5 g. of dry sodium acetate is refluxed for about five hours. After cooling, excess anhydride is removed by vacuum and the residue extracted with ether. The ethereal extract is washed, dried over magnesium sulfate and evaporated to yield the corresponding acetate [5-(7' - acetoxy-3',7'-dimethyloctanyloxy) indane].

The acetate of each of the hydroxyl compounds of Example 9 is prepared using the foregoing procedure.

EXAMPLE 11

A mixture of 20 ml. of dry formic acid and 2 g. of 5-(3',7'-dimethyloct-6'-enyloxy) indane is heated at 50° for two hours and then poured into ice cold potassium bicarbonate solution. The reaction is worked up by extraction with ether, washing the ethereal extract, drying over magnesium sulfate and evaporation to yield the 7-formate.

EXAMPLE 12

A mixture of 2 g. of dry 5-(7'-hydroxy-3',7'-dimethyloct-2'-enyloxy) indane, 15 ml. of acetyl chloride and 20 ml. of triethylamine, under nitrogen, is heated on a steam bath for about six hours. After cooling, the mixture is concentrated under vacuum and the residue taken up in ether. The ethereal extract is washed, dried over magnesium sulfate and evaporated to yield the corresponding 7-acetate.

EXAMPLE 13

The mesylate of each of 7-methoxy-3,7-dimethyloctan-1-ol and 3,7,7-trimethyloctan-ol is reacted with the potassium salt of 5-indanol using the procedure of Example 1 to yield 5-(7'-methoxy-3',7'-dimethyloctanyloxy) indane and 5-(3',7',7'-trimethyloctanyloxy) indane. Mesylate alkylating agent can be prepared from the C-1 alcohol precursor using the procedure of Crossland and Servis, J. Org. Chem., 35, No. 9, 3195 (1970).

EXAMPLE 14

A typical procedure for the preparation of halide alkylating agents is as follows:

3,7 - diethylnona-2,6-dien-1-ol (4.8 g.) is dissolved in 40 ml. of ether, cooled to —50° and 2.44 g. of phosphorus tribromide in 5 ml. of ether is added over 20 minutes. The reaction mixture is stirred for two hours, poured onto ice and extracted with ether. The ethereal extracts are combined, washed with 10% sodium carbonate, water and saturated sodium chloride, dried over sodium sulfate and the solvent concentrated to yield 1-bromo-3,7-diethylnona-2,6-diene.

Alkylating agents of formula II are compounds described heretofore which can be purchased commercially or prepared using previously described procedures. See Science, 164, 323 (1969) and copending applications, Ser. No. 127,803, filed Mar. 24, 1971, Ser. No. 38,503, filed May 18, 1970, now U.S. 3,637,752, and Ser. No. 59,737, filed July 30, 1970, now U.S. 3,649,646, which are incorporated by reference.

What is claimed is:

1. A compound selected from those of the following formula (A):

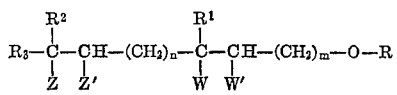

wherein,
R is

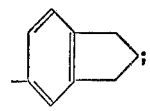

$m$ is zero or one; $n$ is one or two; each of $R^1$, $R^2$ and $R^3$ is lower alkyl; each of W and W' is hydrogen or together a carbon-carbon bond; Z is hydrogen, hydroxy, lower alkoxy, or lower alkyl; and
Z' is hydrogen or together with Z a carbon-carbon bond, provided that when $m$ is zero—then each of W and W' is hydrogen.

2. A compound according to Claim 1 of the formula:

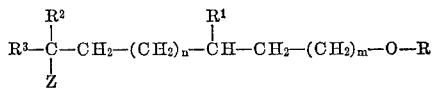

3. A compound of Claim 2 wherein $m$ is one, $n$ is two; each of $R^1$, $R^2$ and $R^3$ is methyl or ethyl; and Z is hydrogen or lower alkyl.

4. A compound of Claim 2 wherein each of $R^1$, $R^2$ and $R^3$ is methyl or ethyl; $m$ is one; and $n$ is two.

5. A compound of Claim 4 wherein Z is hydroxy.

6. A compound of Claim 4 wherein Z is lower alkoxy of one to four carbon atoms.

7. A compound of Claim 4 wherein Z is methoxy and each of $R^1$, $R^2$ and $R^3$ is methyl.

8. A compound of Claim 2 wherein $m$ is zero; $n$ is one; and each of $R^1$, $R^2$ and $R^3$ is methyl or ethyl.

9. A compound of Claim 8 wherein each of $R^1$, $R^2$ and $R^3$ is methyl and Z is hydroxy or lower alkoxy of one to four carbon atoms.

10. A compound according to Claim 1 of the formula:

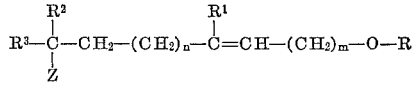

11. A compound of Claim 10 wherein each of $R^1$, $R^2$ and $R^3$ is methyl or ethyl; $m$ is one and $n$ is two.

12. A compound of Claim 11 wherein Z is hydroxy or lower alkoxy of one to four carbon atoms.

13. A compound of Claim 12 wherein each of $R^1$, $R^2$ and $R^3$ is methyl.

14. A compound acording to Claim 1 of the formulas:

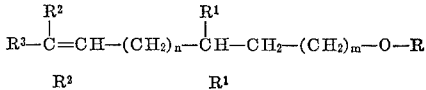

15. A compound of Claim 14 wherein $m$ is one; $n$ is two; and each of $R^1$, $R^2$ and $R^3$ is methyl or ethyl.

16. A compound of Claim 15 wherein each of $R^1$, $R^2$ and $R^3$ is methyl.

17. A compound of Claim 14 wherein $m$ is zero; $n$ is one; and each of $R^1$, $R^2$ and $R^3$ is methyl or ethyl.

18. A compound of Claim 17 wherein each of $R^1$, $R^2$ and $R^3$ is methyl.

19. The compound, 5-(7'-ethoxy-3',7'-dimethyloct-2'-enyloxy) indane, according to Claim 13.

20. The compound, 5-(7'-methoxy-3',7'-dimethyloct-2'-enyloxy) indane, according to Claim 13.

21. The compound, 5-(7'-hydroxy-3',7'-dimethyloct-2'-enyloxy) indane, according to Claim 13.

References Cited

Borkovec: Insect Chemosterilants (1966), pp. 61–63.

BERNARD HELFIN, Primary Examiner

U.S. Cl. X.R.

252—52 R; 260—33.2 R, 613 D, 348 R, 240 H, 332.3; 424—340, 341